United States Patent Office 3,781,243
Patented Dec. 25, 1973

3,781,243
POLYMERIZATION OF VINYL AND VINYLIDENE COMPOUNDS
Erich Gulbins, Heidelberg, Alfred Hauss, Ludwigshafen, Friedrich Kieferle, Limburgerhof, and Jenoe Kovacs, Roxheim, Germany, assignors to Badische Anilin- & Soda-Fabrik Aktiengesellschaft, Ludwigshafen am Rhine, Germany
No Drawing. Filed Jan. 6, 1971, Ser. No. 104,491
Int. Cl. C08f 15/00, 3/30, 3/40
U.S. Cl. 260—87.5 C            3 Claims

ABSTRACT OF THE DISCLOSURE

Homopolymerization or copolymerization of vinyl chloride, vinylidene chloride or vinyl acetate M in bulk, suspension or emulsion in the presence of free radical generating initiators, polymerization aids and at least 0.1% by weight of a copolymerizable compound R containing at least two conjugated carbon-carbon, carbon-nitrogen or carbon-oxygen multiple bonds, the copolymerization parameter $r_R$ being equal to or greater than 1, the copolymerization parameter $r_M$ being less than 1 and the ratio $r_R:r_M$ being more than 20:1, and the compound R being added in portions of not more than 0.01% by weight (based on the monomers M) to the polymerization mixture when the momentarily developed heat of polymerization has exceeded the desired value, said addition being continued until the said value is again reached.

---

The invention relates to a process for the homopolymerization or copolymerization of vinyl chloride, vinylidene chloride and vinyl acetate (M) in which small amounts of a retarder (R) are added to control the heat of polymerization developed.

The polymerization of vinyl and vinylidene compounds is an exothermic reaction, heat being liberated during the polymerization to the extent of about 15 to 30 kilocalories per mole. The amount of heat developed per unit of time is dependent on the polymerization rate, i.e. on the polymerization temperature, the concentration of the monomers, the type and concentration of the initiator and (when polymerization is carried out in an aqueous medium) the ratio of monomers to water.

The temperature of the polymerization mixture has to be kept constant during the polymerization to prepare polymers having uniform molecular weight. For this purpose it is necessary to withdraw continuously the heat of polymerization. Withdrawal of heat may be carried out by known methods by jacket cooling of the polymerization vessel or by evaporative cooling; in both cases the heat is withdrawn by way of a cooling medium, conveniently by water. The amount of heat of polymerization which can be removed per unit of time is limited by the construction of the cooling system (cooling capacity) and the minimum temperature of the cooling water. This means that the amount of heat developed during the polymerization should not exceed a certain value because such amounts of heat otherwise can only be removed in an unsatisfactory manner or not at all. This situation may occur particularly in polymerizations in which very large amounts of heat are evolved, for example when high concentrations of initiator are used. In these cases the desired value for the heat of polymerization is often exceeded when there is only a slight rise in the rate of polymerization, for example in consequence of fluctuations in the concentration of initiator or because of the Trommsdorf effect.

It is an object of the invention to provide a process that enables the heat of polymerization to be controlled by short-term influencing of the rate of polymerization in the homopolymerization or copolymerization of vinyl chloride, vinylidene chloride or vinyl acetate, so that for a given cooling capacity a certain desired value of the heat of polymerization is not exceeded.

Another object of the invention is to make possible polymerization with very high concentrations of initiator in order to shorten the polymerization time by controlling the heat of polymerization.

Other objects will be apparent from the following detailed description.

Methods for interrupting the polymerization of vinyl chloride at conversions of from 60 to 95% are already known from U.S. Pats. 2,616,883 and 2,616,888. The interruption is effected by adding from 0.05 to 1% by weight of styrene or a styrene derivative or by adding from 0.02 to 1% of a conjugated diene to the polymerization mixture. After this stopper has been added, the polymerization is completely ended and the polymer is separated and dried. These patents do not teach how to control the heat of polymerization.

We have found that in the homopolymerization or copolymerization of vinyl chloride, vinylidene chloride or vinyl acetate (M) in bulk, suspension or emulsion in the presence of a free radical generating initiator and a conventional polymerization promotor the heat of polymerization can be controlled by adding up to 0.1% by weight of a copolymerizable organic compound (R) containing at least two conjugated carbon-carbon, carbon-nitrogen or carbon-oxygen multiple bonds (the copolymerization parameter $r_R$ being equal to or greater than 1, the copolymerization parameter $r_M$ being less than 1 and the ratio $r_R:r_M$ being more than 20:1), the compound R being added in portions of not more than 0.01% by weight, with reference to the monomer(s) M to the polymerization mixture when the momentarily developed heat of reaction has exceed the desired value and until the said value has been reestablished.

The process may be used both for the homopolymerization of vinyl chloride, vinylidene chloride or vinyl acetate and for the copolymerization of two or more of these monomers with one another or of one or more of these monomers and one or more other monomers. The process is however preferably used for the homopolymerization of vinyl chloride or for the copolymerization of vinyl chloride with up to 30% by weight of conventional monoolefinically unsaturated comonomers, particularly with vinyl acetate, vinyl propionate or vinylidene chloride.

Polymerization may be carried out in suspension, emulsion or bulk in the presence of an initiator which generates free radicals. When the polymerization is carried out in aqueous suspension or in bulk, it is advantageous to use monomer-soluble initiators in amounts of from about 0.01 to 0.5% by weight based on the monomer. Azo compounds such as azodiisobutyronitrile and azodicarbonamide or organic peroxide such as lauroyl peroxide, benzoyl peroxide, di-tert-butyl perpivalate, isopropyl percarbonate or acetylsulfonylcyclohexane peroxide, alone or in combination, are particularly suitable. A list of conventional initiators will be found in "Polymer Handbook," Interscience Publishers, 1966, II, pp. 1 to 55.

In the case of polymerization in emulsion, initiators which are soluble in water are used such as inorganic peroxides, percarbonates, persulfates, perborates or redox catalysts (see Kainer, "Polyvinylchlorid," Springer-Verlag, 1965, pages 46 to 50).

The polymerization temperature depends on the desired molecular weight of the product. In the case of the polymerization of vinyl chloride the polymerization temperature is preferably at from 35° to 75° C. High grade vinyl chloride polymers are obtained when the temperature remains constant during the polymerization. Fluctuations of more than 0.5° C. may have a detrimental effect.

Conventional additives may be used depending on the medium in which the polymerization is carried out: water-soluable protective colloids may be added in a total concentration of 0.01 to 1.0% by weight with or without surfactants when polymerizing in aqueous suspension; sulfonates or fatty acid soaps may be used in concentrations of more than 0.5% by weight in the case of polymerizations in aqueous emulsion.

Control of the heat of polymerization is achieved by adding retarders, i.e. copolymerizable organic compounds containing at least two conjugated carbon-carbon, carbon-nitrogen or carbon-oxygen bonds. Diene hydrocarbons such as butadiene, isoprene, chloroprene and dimethyl-butadiene; vinylaromatics such as styrene, nuclearsub-stituted styrenes and α-methylstyrene; and acetylenes such as vinylacetylene and isopropenylacetylene are particularly suitable; nitriles such as acrylonitrile, methacrylonitrile and vinylpyridines and carbonyl compounds such as acrolein, methyl vinyl ketone, acrylic esters and methacrylic esters may also be used. The retarder is preferably added as a solution in a conventional solvent. Examples of solvents are: hydrocarbons, chlorinated hydrocarbons, alcohols, and ketones; the monomer M themselves may also be used. To excluded negative influences of the solvent on the polymerization, as little solvent as possible is used, i.e. the concentration of the retarder R in the solvent should be as high as possible.

The retarder R may copolymerize with the monomer M, i.e. at the moment of addition to the polymerization mixture, retarder molecules add onto the growing monomer chain. Because of their special chemical structure, resonance stabilized chain ends are probably formed so that further growth of these chains by adding on monomers M is prevented. The rate of polymerization is thus greatly retarded and this is apparent from a decrease in the heat of polymerization developed. Provided the condition that not more than 0.01% by weight of retarder is added at one time is maintained, it is possible to recommence the polymerization.

It is essential that the copolymerization parameter $r_R$ be equal to or greater than 1, the copolymerization parameter $r_M$ be less than 1, and the ratio $r_R:r_M$ be more than 20:1.

The copolymerization parameter is a measure of the relative speed of a polymerization step possible in copolymerization. It gives the probability of the addition of a monomer M at a chain end —M of the same type.

A definition, methods of measurement and numerical data of copolymerization parameters will be found in the monograph by L. Küchler, Polymerisationskinetik, Springer-Verlag, 1951, on pages 160 to 180, and in "Polymer Handbook" by J. Brandrup and E. H. Immergut, Interscience Publishers, 1966, part II, pages 142 to 290.

The more important vinyl compounds and vinylidene compounds M and some of the copolymerizable compounds R which can be used as retarders are given in Table 1 with the copolymerization parameters associated therewith.

TABLE 1

| | Vinyl chloride | | Vinylidene chloride | | Vinyl acetate | |
|---|---|---|---|---|---|---|
| | $r_M$ | $r_R$ | $r_M$ | $r_R$ | $r_M$ | $r_R$ |
| Butadiene | 0.035 | 8.8 | 0.05 | 1.9 | | |
| Chloroprene | | | | | | |
| 2,3-dichlorobutadiene | | | | | | |
| Styrene | 0.02 | 17 | 0.08 | 1.85 | 0.01 | 55 |
| 2,5-dichlorostyrene | | | | | | |
| α-Methylstyrene | 0.034 | 3.42 | | | | |
| Acrylonitrile | 0.02 | 3.3 | | | 0.06 | 4.1 |
| Methyl methacrylate | 0 | 13 | | | 0.015 | 20 |
| Acrolein | | | | | 0.1 | 3.3 |
| Methyl vinyl ketone | 0.1 | 8.3 | | | 0.05 | 7 |

The total amount of retarder added should not be more than 0.1%, preferably less than 0.02%, by weight with reference to monomers. If too much retarder is added, a worsening of the quality of the product is the result.

The retarder is added in portions of less than 0.01%, preferably in portions of from 0.0005 to 0.002%, by weight. Usually one portion added is enough to decrease the rate of polymerization to such an extent that the heat of polymerization reaches the desired value. If this should not be the case, a second portion, and if necessary still further portions, are added until the desired value has been reached. The intervals between additions may be from a few minutes to about one minute. When larger portions are added, the intervals have to be somewhat longer. Sometimes it may be advantageous to add the retarder in very small portions, i.e. drop by drop a strongly diluted solution. In this case the portionwise addition may become a continuous metering.

The desired value of the amount of heat developed in the polymerization is the criterion for the time at which the retarder is added. This value depends on the type and capacity of the cooling system and on the minimum possible temperature of the coolant available. The amount of heat developed moment by moment in the polymerization is very difficult to measure by direct methods; an indirect measure of the desired value of the heat of polymerization may however be established by two characteristic quantities which are easily accessible:

(a) By the internal temperature: The conventional methods of keeping the polymerization temperature constant consist in adjusting the temperature of the cooling water (advantageously through a regulating circulation) by cooling or heating, so that the polymerization temperature, measured in the interior of the polymerization vessel, remains constant. This is not always simple; especially when there are marked fluctuations in the heat of polymerization momentarily developed, regulation by way of changes in the temperature of the cooling water is often very clumsy. It is even more critical if the amount of heat developed has become so large that the cooling water has reached its minimum temperature so that the heat can no longer be removed completely. In this case it is possible according to the invention to fix a specific desired value for the internal temperature and to arrange for the momentarily measured internal temperature not to exceed this value by more than a predetermined amount, for example 0.5° C. As soon as this value is exceeded, the retarder is added in portions until the desired value has again been reached.

(b) By the temperature of the coolant: When the control equipment is efficient enough, the internal temperature does not vary by more than 0.5° C. In this case it is sufficient to establish the desired value for the temperature of the coolant. This value is conveniently chosen so that there is an adequate safety margin, for example 2° C., from the minimum temperature of the coolant. It is then arranged that this value should be passed by not more than a specified amount, for example 0.5° C. As soon as this is the case, retarder is added until the desired value has again been reached. It is possible in this way to carry out polymerization with very high concentrations of initiator and to shorten the duration of the polymerization considerably.

Whereas on-stream periods of more than ten hours are the rule in the polymerization of vinyl chloride by conventional methods, it is possible to achieve on-stream periods of less than eight hours and in special cases even of less than six hours with the process according to this invention.

The polymers obtained according to this process do not differ detectably in quality from those prepared by prior art methods. The products may be processed into moldings by conventional methods such extrusion, injection molding or calendering.

The following examples illustrate the invention. The parts and percentages specified in the examples are by weight. K values are measured in a 0.5% solution in cyclohexanone at 25° C. according to H. Fikentscher, Cellulosechemie, 13, 6 (1932).

EXAMPLE 1

(a) 6800 parts of water, 0.96 part of an oxypropylated cellulose ether, 4.4 parts of a polyvinyl alcohol and 0.8 part of diisopropylperoxy dicarbonate were introduced into an enameled reactor fitted with a stirrer and temperature regulating means. After the reactor had been closed, air therein was displaced by nitrogen; then 4000 parts of vinyl chloride was pressed into the reactor with nitrogen. The nitrogen was then removed by degassing and polymerization was started while stirring rapidly at 56° C. Heat was withdrawn by jacket cooling, the coolant being water whose temperature was controlled by regulating equipment in accordance with the internal temperature. The minimum temperature of the cooling water was 13° C.; the desired value of the cooling water temperature was fixed at 15° C.

After two hours the evolution of heat had become so strong that the temperature of the cooling water had fallen to just below 15° C. 0.04 part of α-methylstyrene was then metered in as a 1% solution in methanol. After about two minutes, the cooling water had again reached the desired value and remained for some time above the same. After another hour it had again fallen to 15° C. however so that a second portion of α-methylstyrene had to be added. This was repeated a few times more and sometimes the addition of one portion was not enough so that two portions had to be added at an interval of two minutes in order to reach the temperature of the cooling water again. A total of 0.6 part (0.015%) of α-methylstyrene was added. Polymerization was stopped at a conversion of about 90% after the pressure in the reactor had fallen to 4.4 atmospheres gauge. The duration of the polymerization was 8.6 hours. The K value of the product was 71. The internal temperature remained constant to within ±0.1° C. during the whole period of polymerization.

(b) In a comparative experiment carried out under otherwise the same conditions but without adding a retarder, the desired value of the cooling water temperature (15° C.) was again achieved after two hours and shortly thereafter the minimum cooling water temperature of 13° C. was reached. Since it was not possible to cool further, the heat of polymerization could not be removed completely and the internal temperature and consequently also the pressure rose. After a few minutes the safety limit of the pressure was reached so that the polymerization had to be stopped by releasing the vinyl chloride pressure.

(c) In further comparative experiments, the amount of initiator was decreased in stages. It was only when the amount of initiator was 0.48 part that it was possible to carry on the polymerization so that the internal temperature could be kept constant without the temperature of the cooling water falling below 13° C. The polymerization time was then 14.9 hours.

EXAMPLE 2

(a) Example 1(a) was repeated, but the polymerization was carried out at 62° C. and 1.0 part of isopropyl percarbonate was used as initiator. 16° C. was fixed as the desired value for the temperature of the cooling water. This limit was passed after sixty minutes and then 0.04 part of isopropenylacetylene was metered in as a 1% solution in methanol as a retarder. This was repeated at intervals. A total of 0.48 part of the retarder was added. The polymerization time was 6.2 hours and the K value of the product was 65.

(b) In a comparative experiment carried out without adding a retarder, the amount of initiator had to be decreased to 0.6 part in order that the heat of polymerization could be removed completely. The polymerization time was 8.2 hours.

EXAMPLE 3

The conditions were the same as in Example 1(a); a combination of 0.16 part of isopropyl percarbonate and 0.64 part of ditert-butyl perpivalate was used as initiator. The polymerization temperature was 67° C. The desired value of the cooling water temperature was fixed at 19° C. The temperature fell below this limit after three hours and then 0.04 part of acrylonitrile was added as a 1% solution in methanol. Since after three minutes the cooling water temperature still had not risen above 19° C., another 0.04 part of acrylonitrile was added. From then on the desired value was not passed again. The polymerization time was 5.5 hours. The K value was 60.

EXAMPLE 4

(a) In this example it was not the cooling water temperature but the internal temperature which was taken as the measure of the desired value of the heat of polymerization. The conditions were again the same as in Example 1(a) but 1.6 parts of ethyl chloroformate and 13.3 parts of a 3% aqueous solution of hydrogen peroxide and 2.5 parts of sodium bicarbonate were added to the polymerization mixture for initiation. These reagents reacted with one another to form isopropyl percarbonate. This was thus an in situ initiation. The polymerization temperature was adjusted to 56° C. and retarder was to be added when this desired value was exceeded by 0.5° C. This first happened after 430 minutes; 0.04 part of butadiene was added as a 1% solution in methanol. The internal temperature thereupon fell but exceeded the desired value after another sixty minutes. After another 0.04 part of butadiene had been added, the desired value of the internal temperature was not exceeded again. Polymerization was stopped at a conversion of about 91% after 9.2 hours. The K value of the product was 71.

(b) In a comparative experiment carried out under the same conditions but without adding retarder, it was not possible to keep the internal tempearture constant. It rose for a short time to 68° C. Decomposition of the initiator also increased so that polymerization did not reach the conversion of 91% until after 13.5 hours and only then could it be stopped. The K value of the product was 69, i.e. 2 units lower than in Example 4(a).

EXAMPLE 5

Polymerization of vinyl chloride was carried out with the same batch as in Example 1.

Acrylonitrile was used as retarder in the form of a 1% solution in methanol.

To be able to control the heat of polymerization, 2.0 parts of acrylonitrile had to be added. Polymerization was again stopped at a conversion of about 90%. The polymerization time was nine hours.

EXAMPLE 6

Polymerization of vinyl chloride was carried out with the same batch as in Example 1.

Acrolein was used as the retarder in the form of a 1% solution in methanol.

To be able to control the heat of polymerization, 2.6 parts of acrolein had to be added. Polymerization was again stopped at a conversion of about 90%. The polymerization time was 9.4 hours.

We claim:

1. A process for the polymerization of vinyl chloride, vinylidene chloride and vinyl acetate (M) in aqueous suspension or emulsion at a temperature of 35° to 75° C. and in the presence of free radical generating initiators with the addition of not more than 0.1% by weight of a copolymerizable organic compound (R) containing at least two conjugated carbon-carbon, carbon-nitrogen or carbon-oxygen multiple bonds, wherein the copolymerization parameter $r_R$ is equal to or more than 1, the copolymerization parameter $r_M$ is less than 1 and the ratio $r_R:r_M$ is more than 20:1 and the compound R is added in portions of not more than 0.01% by weight, with reference to the monomer(s) M, to the polymerization mixture when the momentarily developed heat of polymerization has exceeded a predetermined desired value and until the said value has been reestablished.

2. A process as in claim 1 wherein vinyl chloride is polymerized and wherein said organic compound R is selected from the group consisting of butadiene, chloroprene, 2,3 - dichlorobutadiene, styrene, 2,5-dichlorostyrene, α-methylstyrene, acrylonitrile, methyl methacrylate, acrolein, and methyl vinyl ketone.

3. A process as in claim 1 wherein vinyl chloride is polymerized and wherein said organic compound R is α-methylstyrene.

References Cited
UNITED STATES PATENTS

| | | | |
|---|---|---|---|
| 3,256,256 | 6/1966 | Reding et al. | 260—87.5 |
| 3,415,797 | 12/1968 | Borsini et al. | 260—92.8 |
| 3,560,462 | 2/1971 | Farber et al. | 260—87.5 |

LESTER L. LEE, Primary Examiner

U.S. Cl. X.R.

260—29.6 R, 29.6 T, 29.7 R, 29.7 T, 63 R, 63 HA I, 73 R, 82.1, 83.5, 85.3 R, 85.5 ES, 85.5 XA, 86.1 R, 86 IE, 87 R